United States Patent [19]

Iwamatsu et al.

[11] Patent Number: 5,039,897

[45] Date of Patent: Aug. 13, 1991

[54] ROTOR STRUCTURES OF A.C. SYNCHRONOUS SERVO MOTOR

[75] Inventors: Noboru Iwamatsu; Yoshiyuki Hayashi, both of Hino, Japan

[73] Assignee: Fanuc Ltd., Yamanashi, Japan

[21] Appl. No.: 526,964

[22] Filed: May 22, 1990

Related U.S. Application Data

[63] Continuation of Ser. No. 255,198, Sep. 16, 1988, abandoned.

[30] Foreign Application Priority Data

Jan. 27, 1987 [JP] Japan .................... 62-7416
Jan. 18, 1988 [JP] Japan ............... PCT/JP88/00033

[51] Int. Cl.⁵ .................. H02K 21/14; H02K 1/22
[52] U.S. Cl. .................... 310/156; 310/261; 310/265
[58] Field of Search .......... 310/51, 126, 114, 162, 310/156, 261, 265

[56] References Cited

U.S. PATENT DOCUMENTS

| | | | |
|---|---|---|---|
| 4,009,406 | 2/1977 | Inariba | 310/156 |
| 4,012,653 | 3/1977 | Shigeta et al. | 310/51 |
| 4,025,810 | 5/1977 | Field | 310/162 |
| 4,406,958 | 9/1983 | Palmero et al. | 310/156 |
| 4,629,916 | 12/1986 | Oudet | 310/162 |
| 4,658,167 | 4/1987 | Popov et al. | 310/261 |
| 4,697,114 | 9/1987 | Amemiya et al. | 310/156 |

FOREIGN PATENT DOCUMENTS

| | | | |
|---|---|---|---|
| 2540014 | 3/1976 | Fed. Rep. of Germany | 310/126 |
| 2743564 | 3/1979 | Fed. Rep. of Germany | 310/114 |
| 59-21267 | 2/1984 | Japan . | |
| 59-59056 | 4/1984 | Japan . | |
| 59-92580 | 6/1984 | Japan . | |
| 59-015810 | 12/1984 | Japan . | |
| 61-199446 | 9/1986 | Japan . | |
| 61-199447 | 9/1986 | Japan . | |
| 62-12358 | 1/1987 | Japan . | |
| 1399861 | 5/1988 | U.S.S.R. | 310/156 |
| 2158653A | 11/1985 | United Kingdom . | |

Primary Examiner—Steven L. Stephan
Assistant Examiner—C. LaBalle
Attorney, Agent, or Firm—Armstrong, Nikaido, Marmelstein, Kubovcik & Murray

[57] ABSTRACT

Provided is a rotor structure by which slot ripple is reduced so that an a.c. synchronous servo motor can achieve a smooth rotation. A rotor structure is provided in which two rotor elements (30, 30') are juxtaposed and brought out of registration in a circular position by an angle ($\theta$) corresponding to a half wave length of a slot ripple wave caused in a rotor having a prior structure, thereby each slot ripple wave caused by each rotor element (30, 30') is cancelled out by the other.

1 Claim, 2 Drawing Sheets

ROTOR STRUCTURES OF A.C. SYNCHRONOUS SERVO MOTOR

This application is a continuation of application Ser. No. 255,198 filed Sept. 16, 1988 (now abandoned).

TECHNICAL FIELD

The present invention relates to a rotor structure of an a.c. synchronous servo motor, particularly to the rotor structure by which slot ripple is eliminated during rotation of the rotor.

BACKGROUND ART

The fluctuations of torque, i.e., slot ripple, occur during rotation of a rotor of a motor having a stator with winding slots and a rotor with magnets, and disturb that rotation. This is because the relative position of the rotor and the stator is changed, and thus the magnetic flux density distribution is changed, according to the angular position of the rotor. This causes a minute uneven feed, and therefore, the finished accuracy of a workpiece is reduced when a servo motor having such a structure is used in a drive mechanism for a feed in, for example, a machine tool.

DISCLOSURE OF THE INVENTION

Accordingly, an object of the present invention is to provide a rotor structure in which slot ripple is reduced as much as possible during rotation of a rotor.

In view of the above-mentioned object, the present invention provides a rotor structure of an a.c. synchronous servo motor characterized in that a plurality of rotor elements are axially disposed along a central axis thereof at a first angular position and a second angular position, angularly offset from the first angular position, wherein the angular offset is based on a slot ripple wave cycle caused during a rotation of the motor, that an angular difference between the first and the second angular positions is an angle corresponding to a half wave length of the slot ripple wave, and that the rotor is constructed such that a summed magnetic flux generated by the rotor element or elements at the first angular position is the same flux as that generated by the rotor element or elements at the second angular position, to reduce the slot ripple thereof.

According to the rotor structure of the present invention, a slot ripple wave based on a change of a relative position between the rotor element or elements at the first angular position and stator slots during rotation, and the other slot ripple wave based on a change of a relative position between the rotor element or elements at the second angular position and the stator slots during rotation are brought out of registration with each other in wave phase by a half wave, and an amplitude of each slot ripple wave is the same for each wave as an amplitude of the summed magnetic flux of each rotor elements at the first or second angular positions is the same for each position. Therefore, both slot ripple waves are eliminated by cancelling each other out when they overlap.

BEST MODE FOR CARRYING OUT THE INVENTION

The present invention will be described in detail hereinafter according to the embodiment shown in the attached drawings.

Figure 1:
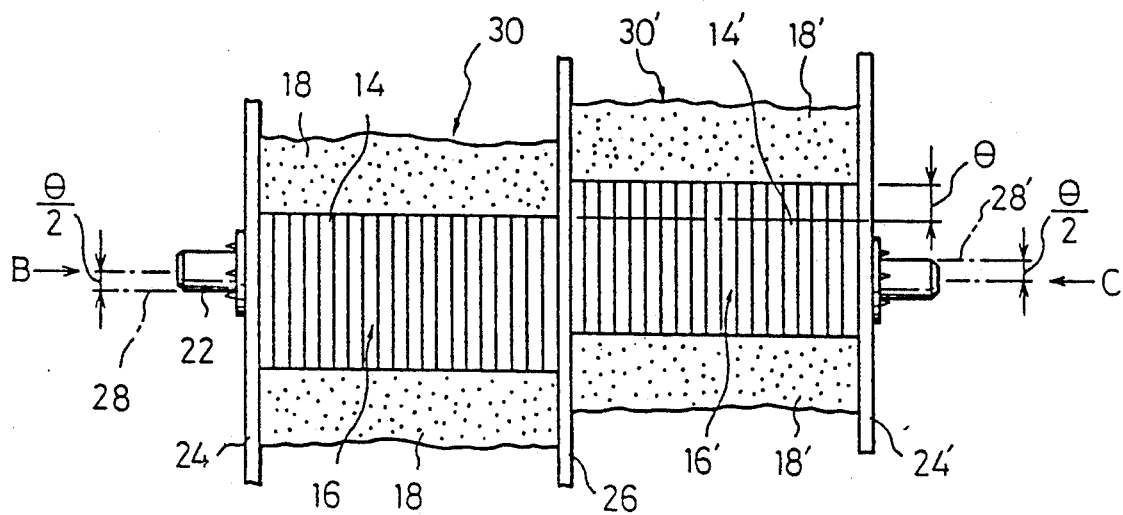
FIG. 1 is a partial broken view taken along the line of an arrow A in FIG. 2 and showing a partial front elevation of a rotor structure according to the present invention.
Figure 2:
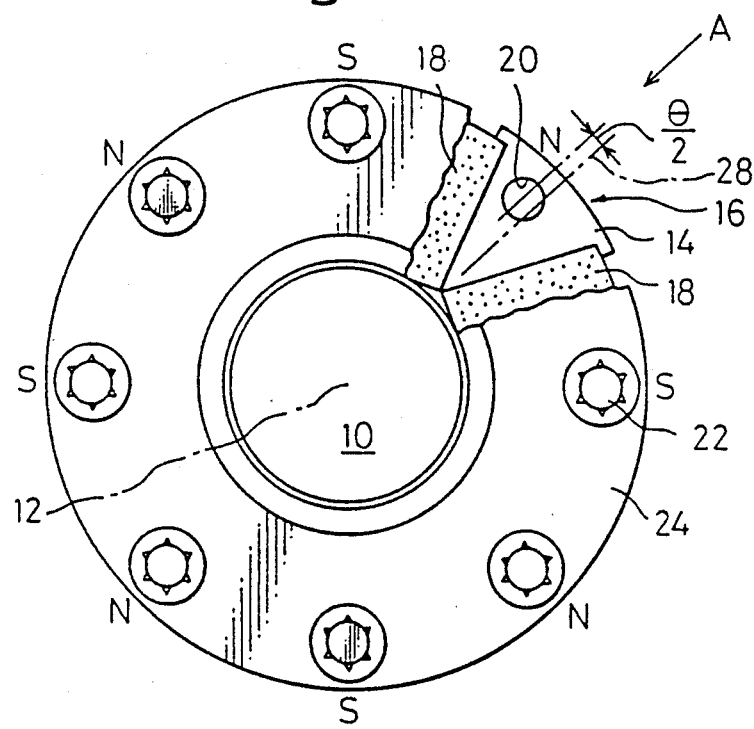
FIG. 2 is a partially broken side elevational view of a rotor structure according to the present invention taken along the line of an arrow B in FIG. 1.

Referring to FIGS. 1 and 2, an 8 pole type rotor structure is shown. The rotor is constructed by arranging 8 poles (each is a N or S pole) in a circle, each of which poles is constructed by a rotor core 16 comprising a plurality of sector-shaped electromagnetic steel plates 14 in a stacked state and held between magnets 18. A bar member 22 is inserted into a hole 20 formed in each electromagnetic steel plate 14 and fixed therein, to hold the aforementioned plurality of electromagnetic steel plates 14 in an aligned state to form a rotor core 16. Movement of the magnets 18 and the rotor core 16 in a longitudinal direction is prevented by mounting end plates 24 of stainless steel at an end of the rotor, which also protect the core. Furthermore, the end plates act as insulators against a magnetic field. The rotor magnetic pole fixed to an axis 10 having a structure such that it can be rotated around a central axis 12.

The structure of the rotor of the prior art is unchanged along the central axis 12 thereof, but the structure of the rotor according to the present invention is changed along the axis 12 (longitudinal direction) thereof, as shown in FIG. 1. A first rotor element 30 and a second rotor element 30' are relatively fixed and axially disposed along the central axis 12 and angularly offset from one another by an angular difference $\theta$ around the central axis 12 (FIG. 2), which angle $\theta$ is an angle corresponding to a half wave length of a slot ripple wave (as explained hereinafter in FIG. 3). The rotor cores 16 and 16', and the magnets 18 and 18' are constructed, respectively, of the same material and have the same dimensions, so that the rotor elements 30 and 30' have the same magnetic flux density distribution and summed magnetic flux. An end plate 24' of the rotor element 30' is disposed for the same purpose as that of the aforementioned end plate 24, and a boundary plate 26 is disposed between the rotor elements 30 and 30' so that interference from the magnetic fields of the rotor o elements 30 and 30' can be prevented.

Slot ripple can be reduced in a motor having such a structure during rotation thereof, because slot ripple is a torque fluctuation caused by a change of a relative position between the rotor and stator slots (not shown), and slot ripple caused by a relative rotation between the first rotor element 30 and the stator slots and the other slot ripple caused by a relative rotation between the second rotor element 30' and the stator slots are brought out of registration in wave phase by a half wave, as both rotor elements 30 and 30' are relatively fixed in an out of registration state by an angle $\theta$ corresponding to a half wave length of the slot ripple caused by a rotation of the rotor element 30 or 30' (this is the same length as a half wave length of slot ripple caused by a rotor having the structure of the prior art). Furthermore, each of the rotor elements 30 and 30' generates the same magnetic field strength. Therefore, both slot ripples, each of which is based on each rotor element 30 or 30', are eliminated by cancelling each other out during rotation of the rotor having the rotor elements 30 and 30' juxtaposed according to the present invention.

Figure 3:
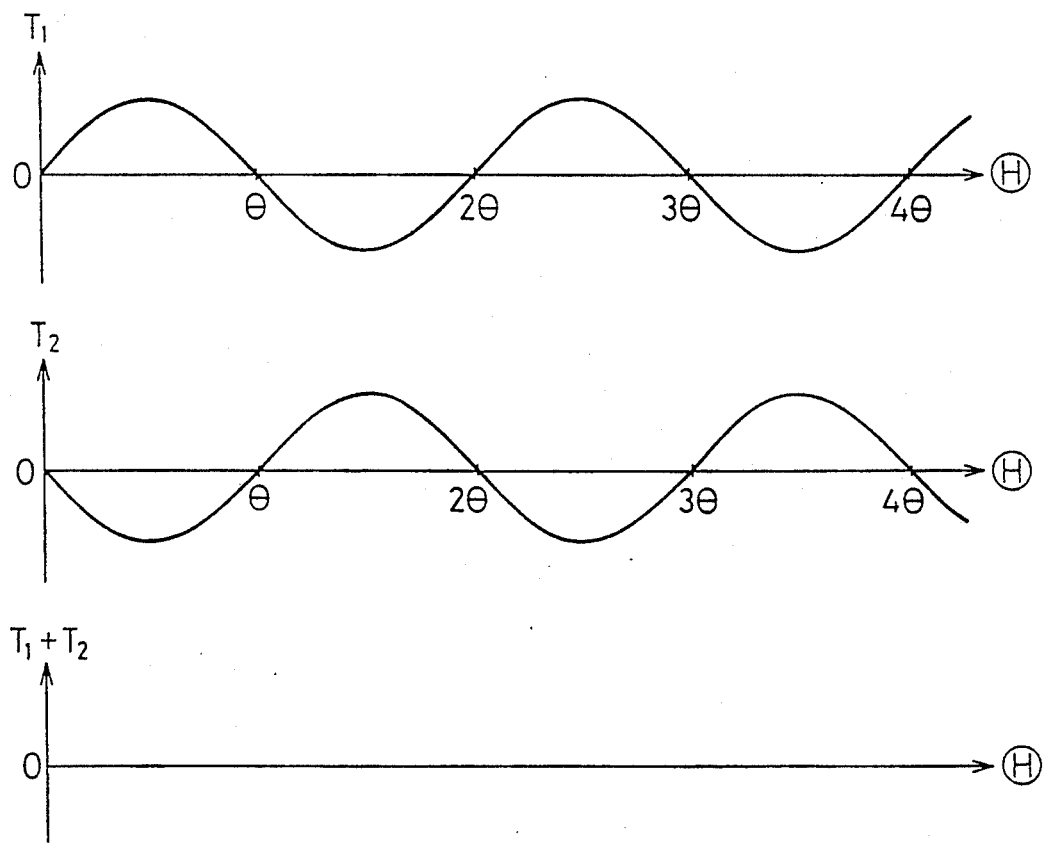
FIG. 3 is a view explaining a mode of operation by which slot ripple is eliminated, based on the rotor structure according to the present invention.

FIG. 3 shows how each slot ripple based on the aforementioned rotor element 30 or 30' is eliminated. The angle θ corresponding to a half wave length of a slot ripple wave is an angle occupied by a quarter slot pitch where two waves of slot ripple are generated in one pitch of the stator slots. Therefore, the out of registration angle 8 shown in FIG. 1 may be set to the angle of a quarter slot pitch. The abscissa (H) of each graph in FIG. 3 shows the angle, the ordinate $T_1$ shows the slot ripple (this may be considered to be torque fluctuation) based on the rotor element 30, another ordinate $T_2$ shows the slot ripple based on the rotor element 30', and a further ordinate $T_1+T_2$ shows the slot ripple based on the rotor comprising the rotor elements 30 and 30', having the structure according to the present invention, namely shows that the slot ripple is eliminated.

In the embodiment shown in FIGS. 1 and 2, the corresponding parts of the first rotor element 30 and the second rotor element 30' are each the same to enable the rotor to be manufactured easily and at a low cost. A hole 20 into which the bar member 22 is inserted is formed in the sector-shaped electromagnetic steel plates 14 deviated by an angle θ/2, which is a half of aforementioned angle θ, from a symmetrical line 28 of each steel plate 14. The first rotor element 30 and the second rotor element 30' are manufactured using the steel plate 14 as the same rotor element, without distinction thereof. The rotor construction shown in FIG. 1 can be obtained by assembling the steel plates 14 in one group, in which the hole 20 is positioned at the upper part of the symmetrical line 28, and in the other group, the hole 20 is positioned at the lower part of the symmetrical line 28' in FIG. 1. That is, the bar element 22 is inserted into the hole 20 when two rotor elements are juxtaposed by assembling two rotor elements so that they are reversely stacked over each other. Therefore, FIG. 2 can be also considered to show a view taken along the line of an arrow C as well as the line of an arrow B.

Whereas the rotor element at the first angular position and the rotor element at the second angular position are respectively constructed by one rotor element 30 or 30' in the above embodiment, each rotor element 30 or 30' may be replaced respectively by a plurality of rotor elements each having a thin thickness. A plurality of thin rotor elements need not be juxtaposed in a fixed order such as aforementioned, for example, each of the rotor elements at the first angular position and each of the rotor elements at the second angular position may be laid out alternately. In this case, a stainless steel plate, etc., may be held, as an insulator against a magnetic field, between each of the rotor elements at the first angular position and each of the rotor elements at the second angular position. Desirably, in view of the manufacturing of the rotor and the cost thereof, all of the rotor elements are formed by the same designed parts as described in the embodiments shown in FIGS. 1 and 2, when such a plurality of rotor elements are used.

A counter electromotive force is considered hereinafter, which is generated by an electromagnetic operation during a rotation of a motor. The counter electromotive force Ep in the prior structure of a rotor is expressed by the following equation.

$$Ep = Vp \sin \omega t$$

As the rotor of the present invention comprises a group of rotor elements at the first angular position and another group of rotor elements at the second angular position, the counter electromotive force $E_1$ thereof is expressed by the following equation.

$$\begin{aligned} E_1 &= (Vp/2) \cdot \sin\omega t + (Vp/2) \cdot \sin(\omega t - \theta \cdot P) \\ &= Vp \cdot \cos(\theta \cdot P/2) \cdot \sin(\omega t - \theta \cdot P/2) \end{aligned}$$

where,
2P: the number of poles of the motor,
θ: angle corresponding to a half wave length of the slot ripple wave When, for example, the number 2P of poles of a motor is 8 poles, and the angle θ is 2.5 degrees, an amplitude of the counter electromotive force $E_1$ generated by the rotor according to the present invention is substantially equal to the amplitude Vp of the counter electromotive force Ep generated by the rotor having the prior structure, as cos (θ·P/2)=0.9962.

The above-mentioned amplitude of the counter electromotive force is generally an important design factor in controlling the drive mechanism by a servo motor. The prior type motor can be used as is and the slot ripple thereof can be reduced, since the size of the motor and the software program for controlling same need not be changed when a servo motor having an prior type rotor is replaced by a servo motor having the rotor structure according to the present invention.

It is apparent from the foregoing description that a rotor structure can be provided according to the present invention, by which the size of the servo motor and the software program for controlling same need not be changed, and the slot ripple thereof can be reduced.

We claim:

1. A rotor structure of an a.c. synchronous servo motor, characterized in that a plurality of rotor elements are axially disposed along a central axis thereof at a first angular position and a second angular position, angularly offset from said first angular position, said angular offset being based on a slot ripple wave cycle caused during a rotation of said motor, such that said angular offset is an angle corresponding to a half wave length of said angular offset is an angle corresponding to a half wave length of said slot ripple wave, and wherein said rotor is constructed such that rotor element or elements disposed at said first angular position generate a first summed magnetic flux, and rotor element or elements disposed at said second angular position generate a second summed magnetic flux, wherein said first and second summed magnetic fluxes are equal to each other, to reduce said slot ripple;

wherein S air rotor element or elements at said first angular position and said rotor element or elements at said second angular position are separated by at least one boundary channel plate made from a material which acts as an insulator against magnetic fields, for preventing interference from the magnetic fields produced by said rotor element or elements at said first and second angular positions respectively; and wherein all of said rotor elements are constructed of the same material having the same size and shape and wherein the number of said rotor element or elements at said first angular position is the same as the number of the rotor element or elements at said second angular position, said rotor elements comprising steel plates, each of said steel plates having a hole for inserting a bar member therein to connect each of said steel plates, said hole being displaced from a symmetrical line of said steel plate by an angle equal to one half of said angular offset.

* * * * *

UNITED STATES PATENT AND TRADEMARK OFFICE
CERTIFICATE OF CORRECTION

PATENT NO. : 5,039,897
DATED : August 13, 1991
INVENTOR(S) : Noboru IWAMATSU et al It is certified that error appears in the above-identified patent and that said Letters Patent is hereby corrected as shown below:

On the cover page, Item [30], first ine, "Jan. 27, 1987" should read -- Jan 17, 1987 --.

Signed and Sealed this

Ninth Day of February, 1993

Attest:

STEPHEN G. KUNIN

*Attesting Officer*     *Acting Commissioner of Patents and Trademarks*